United States Patent
Motoyuki

(10) Patent No.: US 9,395,215 B2
(45) Date of Patent: Jul. 19, 2016

(54) LINEAR ENCODER AND METHOD OF ADJUSTING A GAP BETWEEN A SENSOR UNIT AND A SCALE OF THE LINEAR ENCODER

(71) Applicant: DR. JOHANNES HEIDENHAIN GmbH, Traunreut (DE)

(72) Inventor: Katsumi Motoyuki, Tokyo (JP)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 162 days.

(21) Appl. No.: 14/219,093

(22) Filed: Mar. 19, 2014

(65) Prior Publication Data

US 2014/0284464 A1    Sep. 25, 2014

(30) Foreign Application Priority Data

Mar. 21, 2013  (JP) ................................ 2013-057686

(51) Int. Cl.
*G01D 5/347* (2006.01)
*G01D 5/244* (2006.01)

(52) U.S. Cl.
CPC ........ *G01D 5/34746* (2013.01); *G01D 5/24423* (2013.01); *G01D 5/24433* (2013.01); *G01D 5/34738* (2013.01)

(58) Field of Classification Search
CPC .......... G01D 5/24423; G01D 5/24433; G01D 5/34738; G01D 5/34746
See application file for complete search history.

(56) References Cited

U.S. PATENT DOCUMENTS 6,002,126 A * 12/1999 Feichtinger ........ G01D 5/34707
250/231.13
2004/0045182 A1    3/2004 Freitag et al.

FOREIGN PATENT DOCUMENTS

| EP | 0177711 A2 | 4/1986 |
|----|------------|--------|
| EP | 0947806 A1 | 10/1999 |
| JP | H07 83647 A | 3/1995 |
| JP | 2007040873 A | 2/2007 |
| JP | 7083647 A | 4/2007 |

* cited by examiner

*Primary Examiner* — Francis M Legasse, Jr.
(74) *Attorney, Agent, or Firm* — Leydig, Voit & Mayer, Ltd.

(57) ABSTRACT

A linear encoder includes a housing, a scale disposed within the housing and a sensor unit disposed within the housing facing the scale with a gap between the sensor unit and the scale. The sensor unit is configured to scan the scale and obtain position information. At least one adjustment hole for a gap adjustment is disposed in at least one of the housing and an end cover of the housing at a position corresponding to a position of the gap.

7 Claims, 7 Drawing Sheets

LINEAR ENCODER AND METHOD OF ADJUSTING A GAP BETWEEN A SENSOR UNIT AND A SCALE OF THE LINEAR ENCODER

CROSS-REFERENCE TO PRIOR APPLICATION

Priority is claimed to Japanese Patent Application No. JP 2013-057686, filed on Mar. 21, 2013, the entire disclosure of which is hereby incorporated by reference herein.

FIELD

The present invention relates to a linear encoder suitable for measuring an amount of relative movement in an application such as a machine tool requiring precise position measurement.

The present invention relates further to a gap adjustment structure and method of adjustment for a linear encoder in which a scale and a reading head, which reads a measurement pattern engraved on the scale, are separated by a prescribed gap.

BACKGROUND

In machining devices such as machine tools, positioning accuracy is required to exceed machining accuracy. Recent machining techniques allow for increased machining accuracy, and consequently the required positioning accuracy is also increasing. A highly accurate position measuring device is necessary in order to perform high-accuracy positioning, and linear encoders are known as measuring devices that fulfil this requirement.

The configuration disclosed in FIG. 9 of JP 2007-040873 A, for example, is known as a basic configuration of a publicly known linear encoder. This linear encoder consists of a slider which slides along a glass scale, and a fixed link or the like for mounting on a movable portion of a machine tool or the like. The abovementioned slider comprises a sensor portion which reads displacement, left and right side portion guide rollers provided with leaf springs in order to allow them to slide with little deflection of the glass scale, and lower portion guide rollers.

The abovementioned fixed link is linked via a linking pivot to the slider with the sensor portion, in a state which approaches a floating state by virtue of the urging force of a spring, such that the linear encoder can be provided with the ability to track vibrations from the machine tool.

With the aim of facilitating the exchange of a detecting portion in the length measuring device, JP 07-083647 A discloses a removing and attaching method and removing and attaching jig for a detecting portion in a length measuring device, in which a side end of a case is opened, the removing and attaching jig is installed at said side end, and the detecting portion is moved into and accommodated inside the removing and attaching jig. The removing and attaching jig is separated from the case and is connected to another case, the removing and attaching jig is caused to move and the detecting portion is accommodated inside the other case. This literature also describes that the side end of the case can be opened and closed freely by means of a lid member.

However, the technique in this literature aims to facilitate the exchange of the detecting portion in a length measuring device, and not to facilitate gap adjustment. The side end of the case is opened in order to move the detecting portion into the removing and attaching jig and to accommodate it therein, the removing and attaching jig being mounted at the side end of the opened case. This literature contains no description or suggestion relating to gap adjustment. Further, opening the side end of the case as in this literature results in an opening that is too large, such that the impact of outside air is significant. There is thus the danger that the scale accommodated inside will be exposed to dust, adversely affecting the reading accuracy.

SUMMARY

In an embodiment, the present invention provides a linear encoder. The linear encoder includes a housing, a scale disposed within the housing and a sensor unit disposed within the housing facing the scale with a gap between the sensor unit and the scale. The sensor unit is configured to scan the scale and obtain position information. At least one adjustment hole for a gap adjustment is disposed in at least one of the housing and an end cover of the housing at a position corresponding to a position of the gap.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
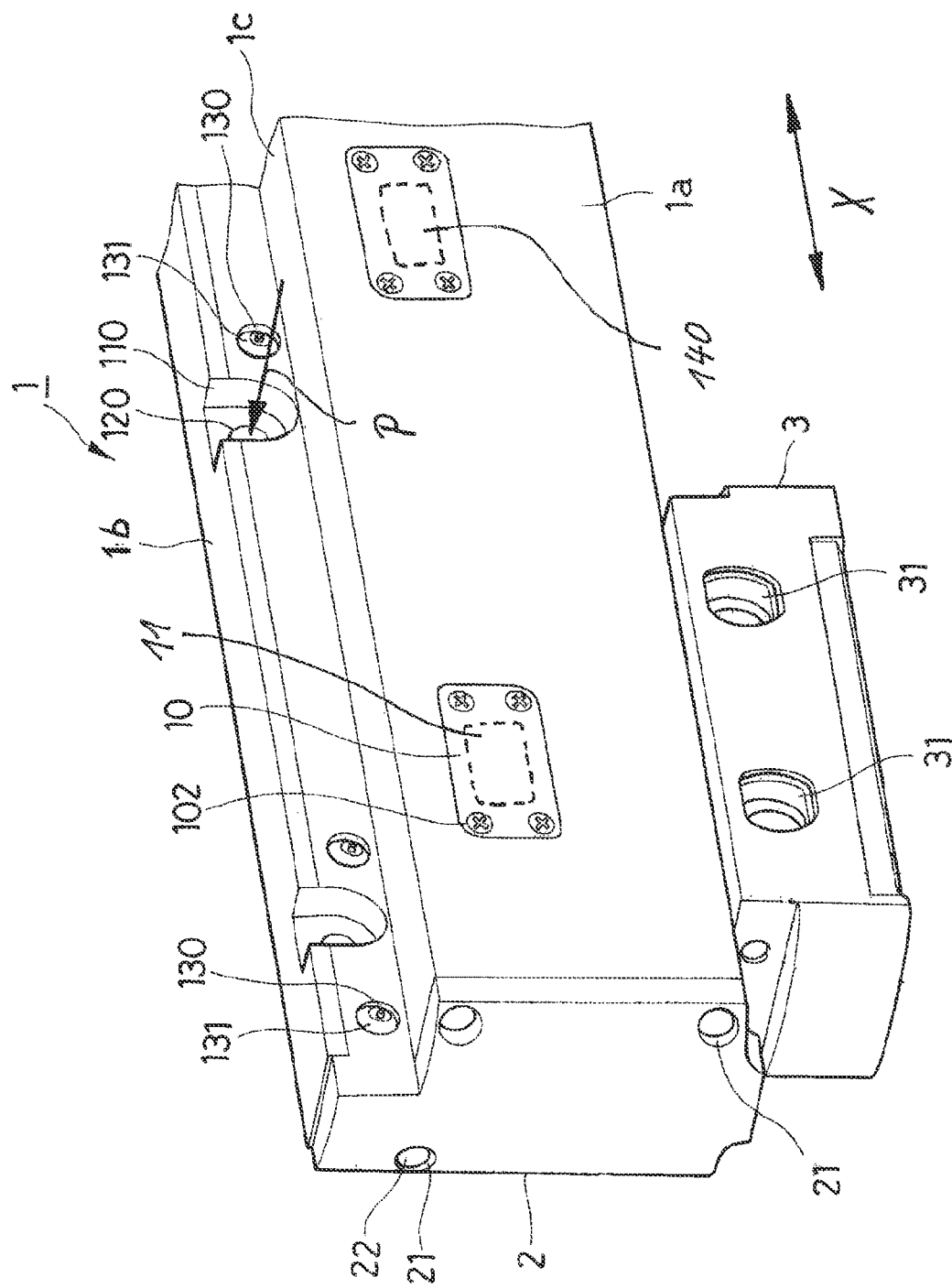
FIG. 1 is a perspective view illustrating the basic configuration of a first embodiment of the linear encoder of the present invention.

The present invention recognizes that it is difficult to adjust the gap between the scale and the sensor unit in a housed linear encoder, also named sealed linear encoder. In particular, that it is extremely difficult to adjust the gap between the scale and the sensor unit in a housed encoder in which there is no portion of contact between the scale and the sensor unit and in which the scanning head is not guided on the scale or on a guide of the housing.

In an embodiment, the present invention provides a linear encoder having a scale, a housing which accommodates the scale, and a sensor unit which is disposed facing the abovementioned scale and which scans the scale and obtains position information, wherein the abovementioned housing or an end cover thereof has at least one adjustment hole for gap adjustment in a position corresponding to a gap between the scale and the sensor unit.

In an embodiment, there is no portion of contact between the abovementioned scale and the abovementioned sensor unit.

In an embodiment, the sensor unit is not guided on the scale or the housing.

In an embodiment, there are more adjustment holes in said housing disposed one after another in the measuring direction.

In an embodiment, there is a first adjustment hole arranged in the vicinity of one end portion of said housing and a second adjustment hole arranged in the vicinity of the other end portion of said housing.

In an embodiment, the at least one adjustment hole is formed in the front side of said housing and the scale is orientated so that a gap gauge can inserted through said adjustment hole in a direction corresponding to a direction of holes for screwing said housing on a device.

In another embodiment, the present invention provides a method of adjusting a linear encoder having a scale, a housing which accommodates the scale, and a sensor unit which is disposed facing the abovementioned scale and which scans the scale and obtains position information, and which has an adjustment hole for gap adjustment in a position in the abovementioned housing or in an end cover thereof corresponding to a gap between the scale and the sensor unit, in which
(1) a cover installed on the adjustment hole is removed exposing the adjustment hole,
(2) a gap gauge is inserted between the scale and the sensor unit from the abovementioned adjustment hole,
(3) a gap between the scale and the sensor unit is adjusted by adjusting the position of the sensor unit, and
(4) the gap gauge is removed and the abovementioned cover is installed.

In an embodiment of the method of adjusting a linear encoder according to (3) hereinabove, there is no portion of contact between the abovementioned scale and the abovementioned sensor unit.

Employing the linear encoder and method of adjusting a linear encoder according to embodiments of the present invention has the advantage that adjustment of the gap between the scale and the sensor unit is straightforward. There is in particular the advantage that it is extremely straightforward to adjust the gap between the scale and the sensor unit in an encoder in which there is no portion of contact between scale and the sensor unit.

The linear encoder according to the present invention is a linear encoder having a scale, a housing which accommodates the scale, and a sensor unit which is disposed facing the abovementioned scale and which scans the scale and obtains position information, in which the abovementioned housing or an end cover thereof has at least an adjustment hole for gap adjustment in a position corresponding to a gap between the scale and the sensor unit.

Thus, by providing an adjustment hole for gap adjustment in a position in the housing corresponding to the gap between the scale and the sensor unit, it is possible for the gap to be adjusted without removing the housing, and gap adjustment is thus extremely straightforward.

The adjustment hole is formed in the housing and/or the end cover of the housing. Further, one or more adjustment holes may be formed if the adjustment hole is formed in the housing. The position in which the hole is formed is a position corresponding to the gap, in other words a position obtained by moving parallel to the surface of the scale from the position of the gap between the scale and the sensor unit, and it may be formed in any position provided that it is a position in which the gap can be adjusted by inserting a gap gauge or the like.

Specifically, if a rectangular hole is to be formed, it should have a height of between 10 mm and 15 mm and a width of between 20 mm and 30 mm. If the shape is not rectangular, its size should be such that its area corresponds to that of the shape described above. Further, the position of the centre of the adjustment hole should be in substantially the same position in the vertical direction as the position of the centre of the gap.

The shape of the adjustment hole is not particularly restricted, and it may be any shape provided that it is a shape which allows gap adjustment to be performed, but considering ease of sealing and ease of adjustment it is preferably rectangular or circular.

The adjustment hole is normally covered by a cover in order to ensure hermeticity inside the housing. The cover is formed for example from a plate-shaped member, and is secured detachably using fixing means such as screws, or by means of its own retaining force. In order to ensure hermeticity, a sealing member comprising a resilient material such as an elastomer or resin material may be interposed between the cover and the housing. The cover should also preferably be accommodated in a stepped portion of the housing formed around the adjustment hole in such a way that the outer surface of the cover lies within the same plane as the outer surface of the housing.

The housing accommodates the scale and the sensor unit and has the role of protecting the same from the external environment, and it also acts as a support structure for the encoder, being secured to a structure constituting a measurement reference such as the machine base which does not normally move. For this reason multiple securing portions for securing the housing to the structure are formed in the housing and disposed at fixed intervals in the longitudinal direction thereof The securing portions generally comprise screw mounting holes formed such that securing can be effected using mounting screws, but other securing methods may also be used.

The housing is normally a hollow rectangular bar having a rectangular cross section, and it extends in an elongated fashion in the measurement direction X. Scale securing portions for securing the scale are also provided, and an opening which allows a structure connecting the sensor unit and the object of measurement to slide concomitantly with movement of the object of measurement is provided in the lower portion or the side portion.

Because as described above the housing functions as a support structure for the encoder, the material from which it is made is preferably a material which has a certain degree of stiffness and is not readily affected by temperature variations. Specifically, it is preferably formed from a metal material such as iron, stainless steel, aluminium or an alloy thereof, titanium or an alloy thereof, or copper or an alloy thereof Considering ease of machining, stiffness and lightness, aluminium or an alloy thereof is particularly preferable. Further, depending on the conditions, carbon-based materials or resin materials may also be used, and they may also be used in combination with the abovementioned metal materials.

For the scale, a scale similar to those used in typical linear encoders can be used. The scale is normally made from glass, and although metal materials and the like may also be used, glass is superior in that, for example, it is not readily affected by temperature variations, high accuracy can be achieved easily, and it is relatively inexpensive. In particular glass is most preferable for transmission-type scales.

A prescribed pattern for reading position information, movement information and the like is formed on and engraved in the scale. A read signal is generated by means of this pattern, and position/movement information measurement signals such as incremental data and absolute data can be obtained. The pattern can be formed by forming a film of metal material, normally chromium or the like, on the outer surface, and patterning this film of metal material. Patterning can be performed using known methods in the fields of thin-film technology or semiconductor technology, such as etching.

The sensor unit reads the pattern on the abovementioned scale and converts it into an electrical signal. If the sensor unit is an optical type then it is provided with a light source comprising a light-emitting element, and a light-receiving element which receives reflected light or transmitted light obtained from the abovementioned pattern and converts it into an electrical signal. Also, a power supply circuit for the abovementioned light-emitting element and light-receiving element, an electronic circuit which processes the signal output by the light-receiving element, and a communications circuit which exchanges data with external circuits and devices are installed as necessary.

The sensor unit is disposed facing the abovementioned scale, and it scans and reads the pattern on the surface thereof, separated therefrom by a fixed gap. Here, there is a type in which scanning is performed with the sensor unit and the scale in a non-contacting state.

Other aspects of the basic configuration of the linear encoder in the present invention can be substantially the same as in typical linear encoders.

Figure 2:
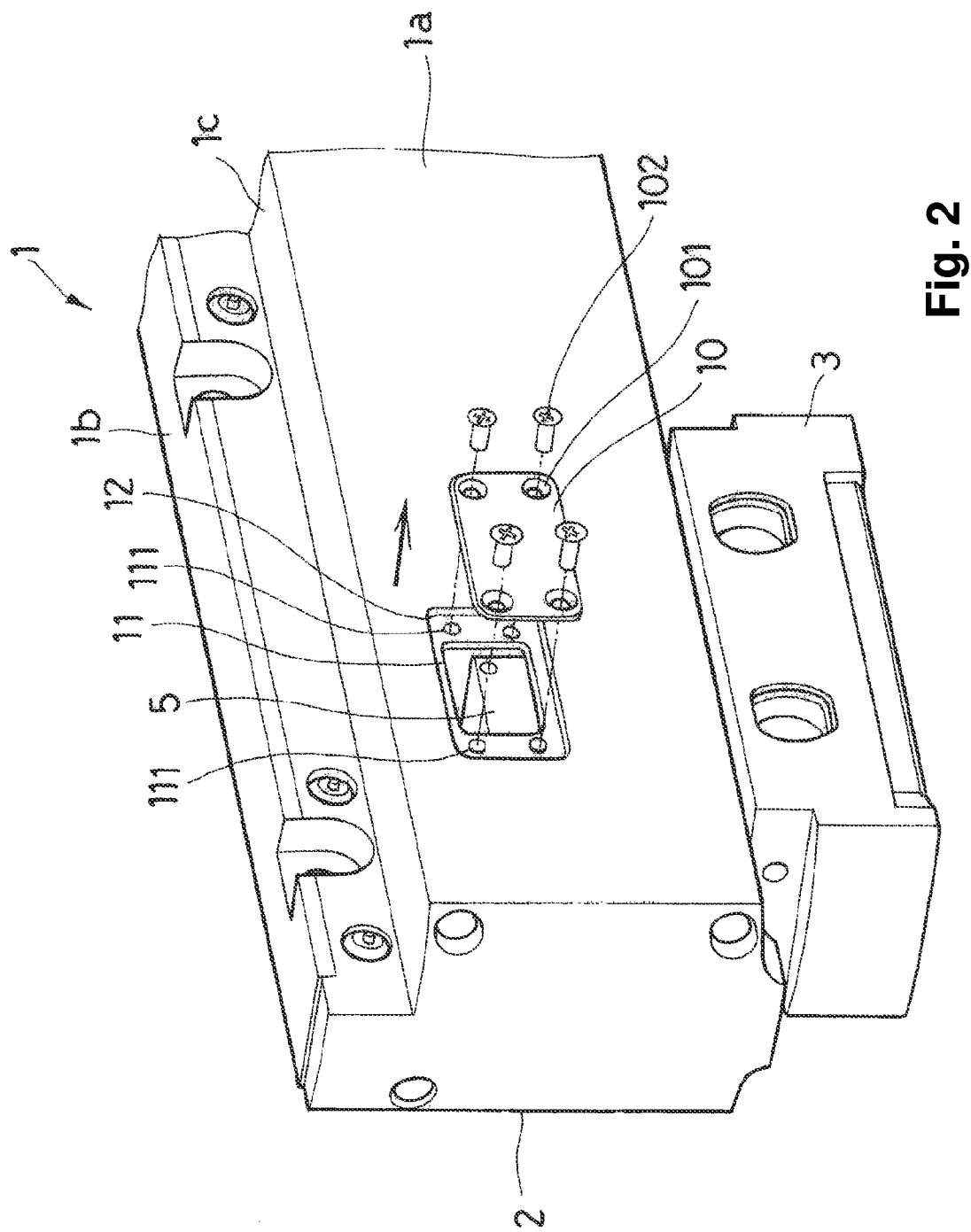
FIG. 2 is a perspective view illustrating the basic configuration of the first embodiment of the linear encoder of the present invention, in a state in which an adjustment hole cover has been removed.
Figure 3:
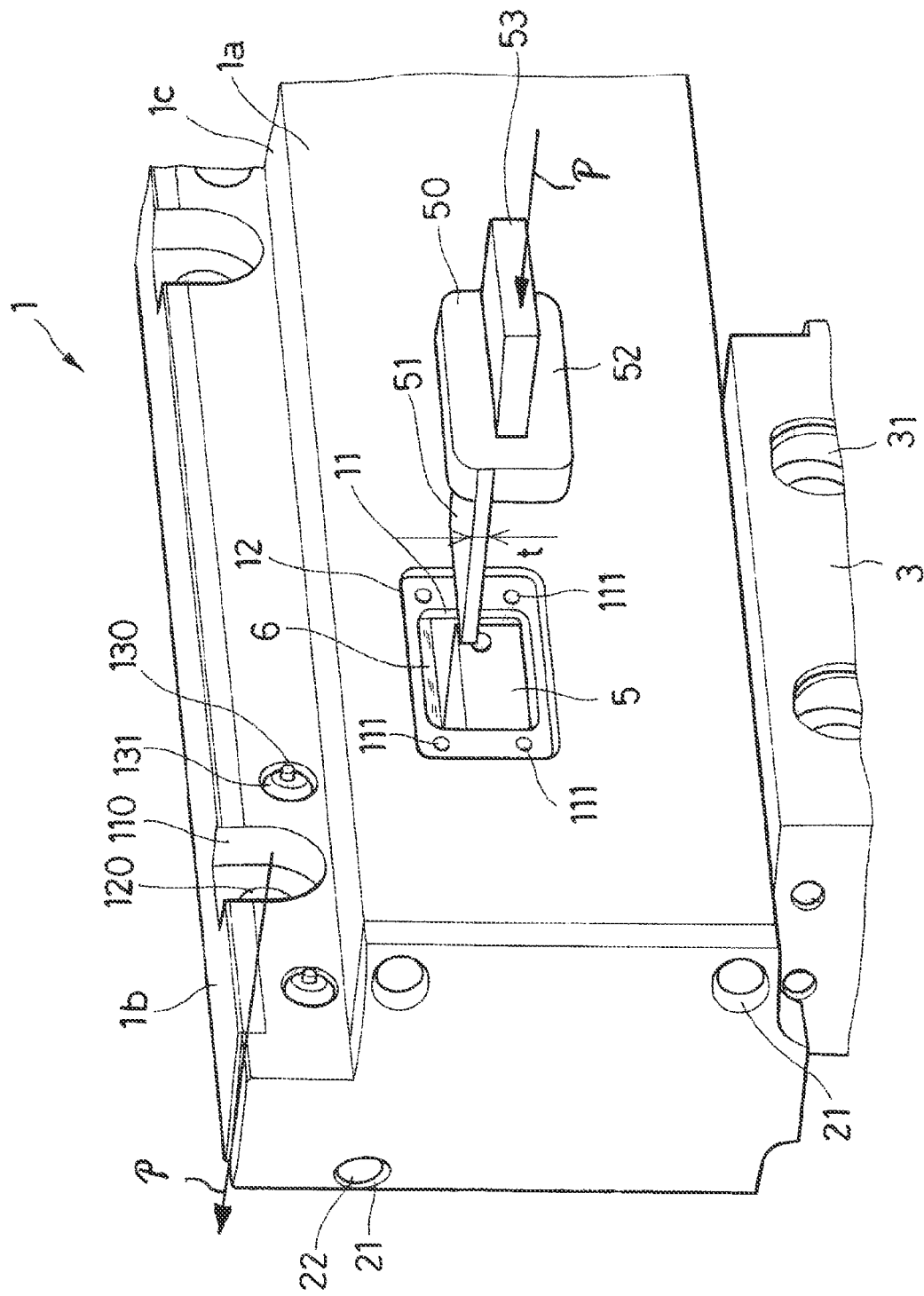
FIG. 3 is a perspective view illustrating the basic configuration of the first embodiment of the linear encoder of the present invention, in a state in which a gap gauge has been inserted into the adjustment hole.
Figure 7:
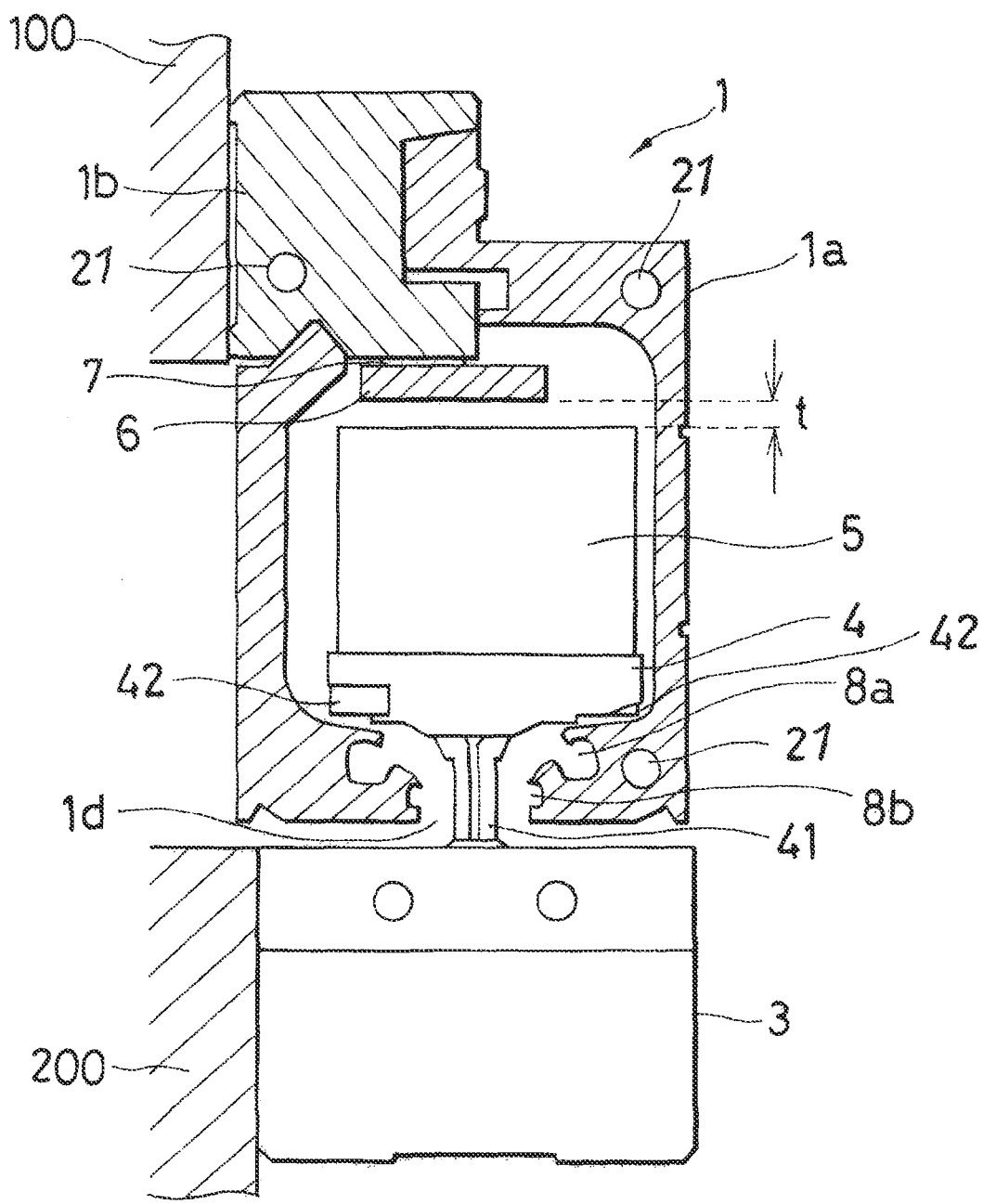
FIG. 7 is an end-portion cross-sectional view illustrating the basic configuration of the linear encoder, for example, according to the first and second embodiments of the present invention.

FIGS. 1 to 3 and FIG. 7 are drawings illustrating a first embodiment of the linear encoder which is the device of the present invention, where FIGS. 1 to 3 are perspective views and FIG. 7 is a cross-sectional view.

In FIGS. 1 to 3 and FIG. 7, the linear encoder of the present invention has a scale 6, a housing 1 which accommodates the scale 6, and a sensor unit 5 which scans the scale 6 accommodated inside the housing 1 generating a measurement signal. In the measuring process the sensor unit 5 moves along the scale 6 in a measuring direction X and measures the path of the sensor unit 5 relatively to the scale 6 in this direction X. The sensor unit 5 is not guided on the scale 6 or the housing 1. There is no point of contact between the sensor unit 5 and the scale 6 and there is no point of cantact between the sensor unit 5 and the housing 1.

An adjustment hole 11 is formed in the front side face of the housing 1 in a position corresponding to the gap t between the abovementioned scale 6 and the sensor unit 5. The at least one lockable adjustment hole 11 is preferably in the vicinity of one end portion of the housing 1. In this example the adjustment hole 11 is a rectangular hole, and normally, it means in the measuring process, a cover 10 is secured detachably using locking screws 102 in order to maintain internal hermeticity. The locking screws 102 goes through holes 101 in the cover 10 and are screwed in tap holes 111 of the housing 1.

Preferably there are more adjustment holes 11 and 140 disposed one after another in the measuring direction X. Especially a first adjustment hole 11 is arranged in the vicinity of one end portion of the housing 1 and a second adjustment hole 140 is arranged in the vicinity of the other end portion of the housing 1.

Then, as illustrated in FIG. 2, if the locking screws 102 are removed and the cover 10 is removed, the adjustment hole 11 is exposed and an adjustment jig such as a gap gauge 50 can be inserted into the gap t (shown in FIG. 7) between the scale 6 and the sensor unit 5 through the adjustment hole 11, and the gap t can be adjusted. Adjustment of the gap t is performed in this example by adjusting the relative height of the sensor unit 5 with respect to the scale 6. By adjusting the sensor unit 5 with respect to the scale 6, the mounting position of a head 3 to which the sensor unit 5 is secured is also adjusted.

The basic configuration of the linear encoder of the present invention will now be described in detail. As illustrated in FIG. 7, in the linear encoder of the present invention a scale 6 on which a pattern for measuring has been engraved is disposed inside a rectangular housing 1 the cross section of which is elongated in the vertical direction. The housing 1 consists of a housing base portion 1b constituting a supporting base for the scale 6 and for a housing exterior portion 1a discussed hereinbelow, and the housing exterior portion 1a which covers the scale 6 and the sensor unit 5 protecting them from the external environment.

The housing base portion 1b is mounted on and secured to the casing or base portion, for example, of the device on which it is to be installed, this being the fixed side of the device 100. The scale 6 is secured to the lower surface of the housing base portion 1b by means of adhesive 7 such that it is parallel to the abovementioned lower surface. The adhesive 7 is resilient and can absorb differences between the rates of expansion and contraction of the housing base portion 1b and the scale 6 due to temperature variations.

The scale 6 is formed from a transparent material such as glass. Further, a pattern for measurement is engraved on the side opposite to the abovementioned adhered surface. The pattern can be formed by patterning during vapour deposition of a metal material such as chromium, or by etching in a subsequent process. Although the scale may also be formed from a metal material, glass-based materials are superior in that the influence thereon of heat is low, high accuracy can be achieved easily and pattern formation is straightforward.

The sensor unit 5 is disposed below the scale 6 across a fixed gap t. A light-emitting element constituting a light source and an optical sensor for reading the pattern formed on the abovementioned scale, and an electronic circuit for processing the electrical signal output by the abovementioned sensor, and the like, are installed in the sensor unit 5. Maintaining a fixed distance, in other words gap t, between the lower surface of the abovementioned scale 6 and the outer surface of the sensor unit 5 is an extremely important element in stabilising the read signal output by the sensor unit 5, preventing malfunctions and maintaining a fixed accuracy.

The sensor unit 5 is set on a bed 4 constituting a supporting base and is secured by means of screws 42. A foot 41 having a thin plane of projection in the direction of travel is implanted in the lower portion of the bed 4, facing downward, and is coupled to a scanning head 3. As illustrated in FIG. 1, locking holes 31 are formed in the scanning head 3 such that it can be secured to a movable portion 200 of the device constituting the object of measurement. Then, the abovementioned gap adjustment is performed at the time securing is effected using the locking holes 31.

As illustrated in FIG. 1, a stepped portion 1c is formed in the housing exterior portion 1a, and screw holes 130 are formed in the stepped portion 1c at fixed intervals in the longitudinal direction. It can then be secured detachably to screw holes 131 formed in corresponding positions in the housing base portion 1b using screws.

Counterbore holes 110 are formed in the abovementioned stepped portion 1c at different positions to the abovementioned screw holes 130, at fixed intervals.

Locking holes 120 for securing the housing 1 on the device 100 are formed in the housing 1, especially in the housing base portion 1b in corresponding positions. The housing 1 can then be secured to the fixed side of the device 100 using locking screws via the locking holes 120 in a direction P.

An end plate 2 for blocking and hermetically sealing the housing end portion is disposed detachably at the end portion of the housing 1. Locking holes 21 are formed in the end plate 2 such that it can be secured detachably using locking screws 22 in screw holes 21 formed in corresponding positions in the end portion of the housing 1. A sealing member may also be disposed between the end plate 2 and the end portion of the housing 1, in order to ensure sealing performance.

An opening 1d through which the abovementioned foot 41 slides is formed in the lower portion of the housing exterior portion 1a. Then, a pair of seal lips, secured by means of sealing material securing portions 8a, 8b, is disposed in order to ensure the hermeticity of the opening 1d. The seal lips comprise a resin or resilient member which is tapered and is in the shape of a thick film, and they are disposed facing obliquely downward opposite each other in such a way that except in the section in which the foot 41 is present, corresponding distal end portions of both seal lips meet and attach hermetically to each other such that a hermetically sealed state can be ensured. Further, in the section in which the foot 41 is present, the distal end portions of the seal lips attach hermetically around the foot 41 such that hermeticity can be similarly maintained.

The adjustment hole 11 and 140 is formed in the front side face of the housing 1 in a position corresponding to the gap t between the abovementioned scale 6 and the sensor unit 5. The gap t runs in a plane, wherein the adjustment holes 11 and 140 are in this plane. The adjustment holes 10 and 140 and the scale 6 are oriented so that the gap gauge 50 can inserted through the exposed adjustment holes 11, 140 in a first direction P. This first direction P corresponds to the direction P of the holes 120 and thus in the direction P for screwing the housing 1 on the device 100.

A method of adjusting the linear encoder of the present invention will now be described in detail:

(1) First, as illustrated in FIG. 2, the locking screws 102 of the cover 10 blocking the adjustment hole 11 are removed, and the cover 10 is removed.

(2) Next, as illustrated in FIG. 3, a gauge portion 51 of a gap gauge 50 is inserted through the exposed adjustment hole 11. The thickness of the gauge portion 51 formed at the front portion of the gap gauge 50 is adjusted to be a thickness corresponding to the required gap t. Also, a flange 52 is formed at the rear of the gauge portion 51, and a handle 53 is formed further to the rear thereof The flange 52 is formed with a size substantially the same as the inner periphery of the stepped portion 12 formed around the adjustment hole 11, and by causing part thereof to be accommodated in the stepped portion, in the same way as the cover 10, it is caused to engage with the stepped portion 12 and is retained therein by itself during the adjustment operation. Further, the adjustment hole 11 is covered and hermetically sealed by the flange 52, and the impact of outside air during adjustment is thus extremely small.

(3) Next, the position of the scanning head 3 is adjusted by pressing the scanning head 3 against the gauge portion 51 of the gap gauge 50 such that the gap t is the same as the thickness of the gauge portion 51. Then, the scanning head 3 is secured to the movable portion 200 in the position in which the abovementioned gap has been adjusted.

(4) Finally, the gap gauge 50 is extracted and the adjustment hole 11 is blocked by mounting the cover 10 using the reverse process to that used when it was removed, thereby completing the adjustment operation.

It should be noted that in the abovementioned example the adjustment hole 11 is formed in the vicinity of the end portion of the housing, but the adjustment hole 11 may be formed in any position as necessary, and multiple adjustment holes 11, 140 may also be formed.

Figure 4:
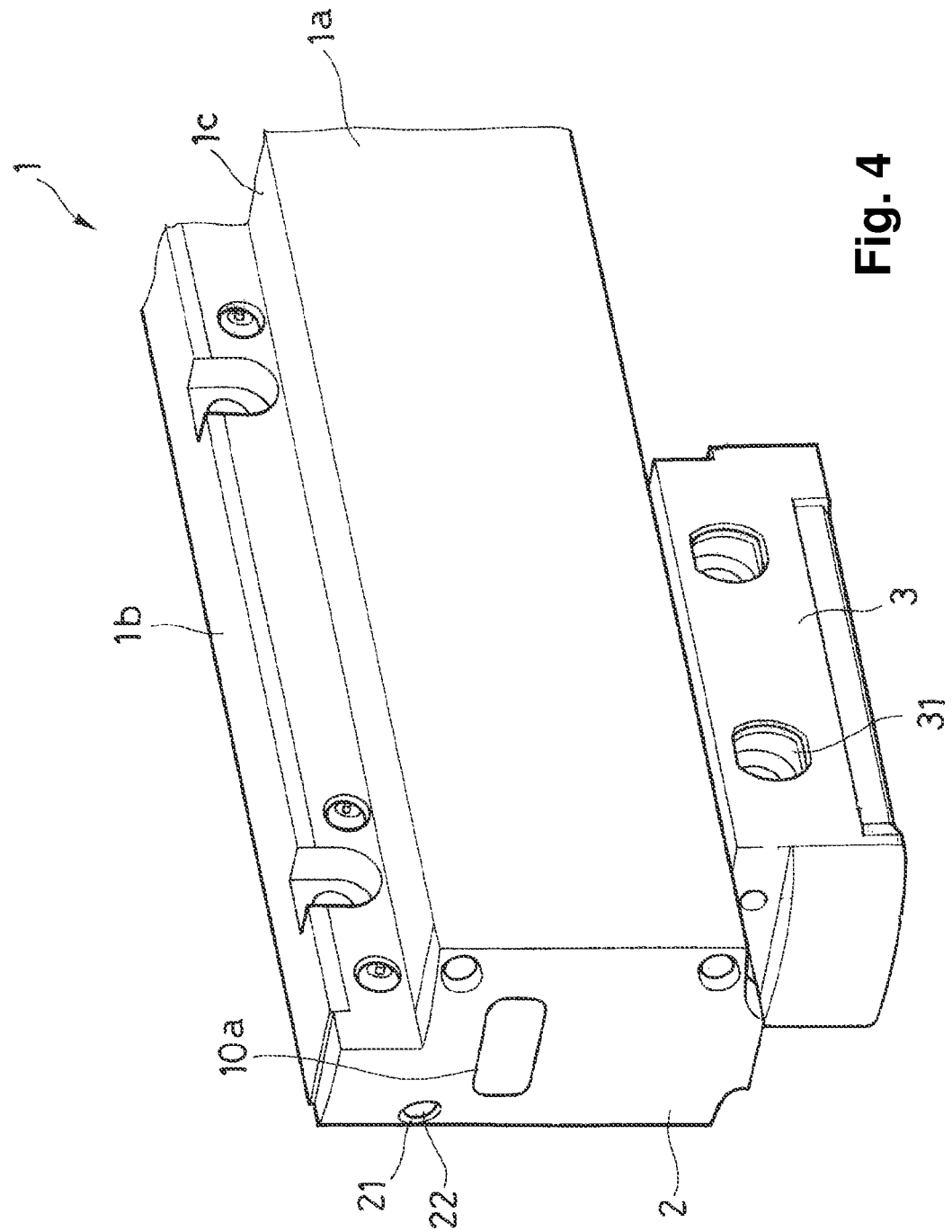
FIG. 4 is a perspective view illustrating the basic configuration of a second embodiment of the linear encoder of the present invention.
Figure 5:
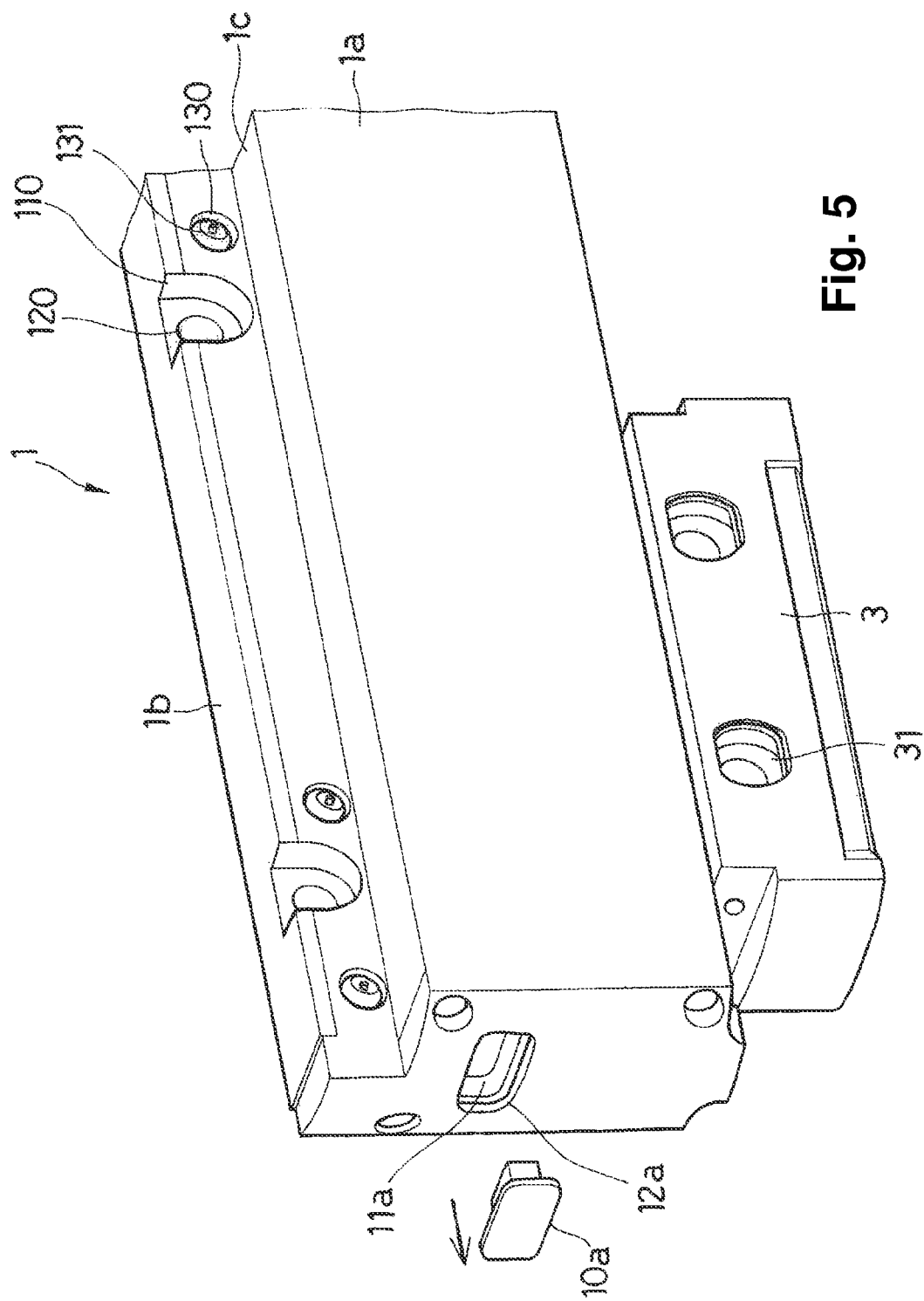
FIG. 5 is a perspective view illustrating the basic configuration of the second embodiment of the linear encoder of the present invention, in a state in which an adjustment hole cover has been removed.
Figure 6:
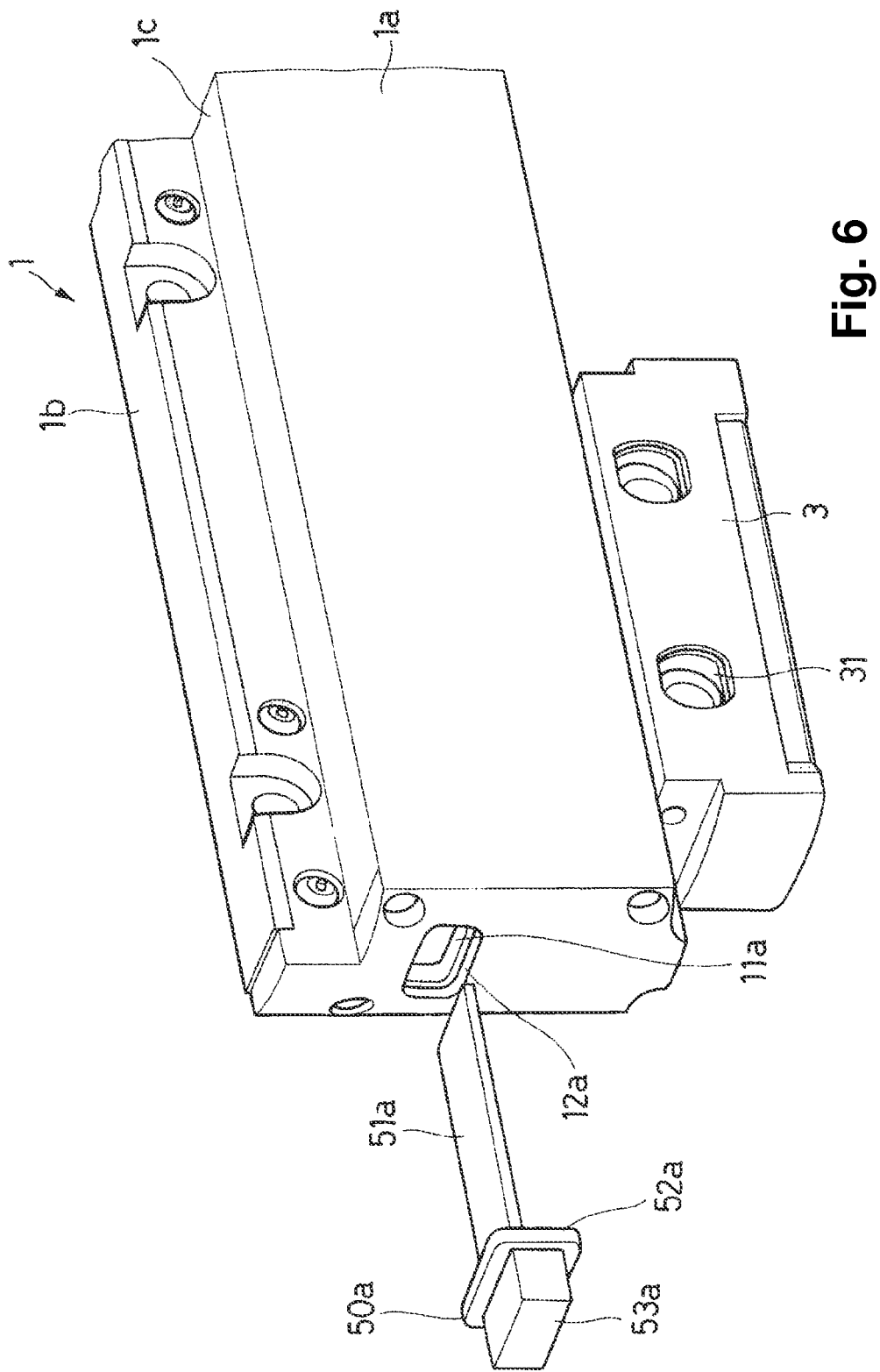
FIG. 6 is a perspective view illustrating the basic configuration of the second embodiment of the linear encoder of the present invention, in a state in which a gap gauge has been inserted into the adjustment hole.

FIGS. 4 to 6 are drawings illustrating a second embodiment of the linear encoder of the present invention, where FIGS. 4 to 6 are perspective views. In this example an adjustment hole 11a is formed in the end plate 2. The end plate is replaceable from the housing exterior portion 1a. Further, if the end plate 2 is thick, the depth of the side faces of the adjustment hole 11a or the depth of a step 12a can be increased. Thus by forming a cover 10a using a material that is elastically deformable to some extent such as a resin material, for example, it can be made to engage without the use of fixing means such as screws, by means of the contact force and the frictional force between the cover 10a and the side faces of the abovementioned adjustment hole 11a and the step 12a.

In this example, because the adjustment hole 11a is in the end plate 2, the scanning head 3 must be moved to the end portion of the housing 1 for adjustment, as illustrated in FIG. 6. Also, the length of the gauge portion 51a of the gap gauge 50a must also be adapted so that it can reach the sensor unit 5. Moreover, the sizes of the flange 52a and the handle 53a are also adapted as appropriate.

The detection system is not limited to an optical type, and may also be a magnetic type or induction type system.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A linear encoder, comprising:
a housing;
a scale disposed within the housing;
a sensor unit disposed within the housing facing the scale with a gap between the sensor unit and the scale, the sensor unit being configured to scan the scale and obtain position information;
at least one adjustment hole for a gap adjustment disposed in at least one of the housing and an end cover of the housing at a position corresponding to a position of the gap; and
a removable cover on the at least one adjustment hole,
wherein the at least one adjustment hole is configured such that a gap gauge is insertable into the gap between the scale and the sensor unit through the at least one adjustment hole when the cover is removed.

2. The linear encoder according to claim 1, wherein the scale and the sensor unit do not contact one another.

3. The linear encoder according to claim 2, wherein the sensor unit is not guided on the scale and is not guided on the housing.

4. The linear encoder according to claim 1, wherein the at least one adjustment hole comprises a plurality of adjustment holes disposed in the housing one after another in a measuring direction.

5. The linear encoder according to claim 4, wherein the at least one adjustment hole includes a first adjustment hole arranged in a vicinity of a first end portion of the housing and a second adjustment hole arranged in a vicinity of a second end portion of the housing.

6. The linear encoder according to claim 1, wherein the at least one adjustment hole is disposed in a front side of the housing and the scale is orientated so that the gap gauge is insertable through the at least one adjustment hole in a direction corresponding to a direction of holes that are disposed in the housing for screwing the housing on a device.

7. A method of adjusting a linear encoder comprising a housing, a scale disposed within the housing, a sensor unit disposed within the housing facing the scale with a gap between the sensor unit and the scale, the sensor unit being configured to scan the scale and obtain position information, and at least one adjustment hole for a gap adjustment disposed in at least one of the housing and an end cover of the housing at a position corresponding to a position of the gap, the method comprising:
removing a cover installed on the at least one adjustment hole so as to expose the at least one adjustment hole;
inserting a gap gauge between the scale and the sensor unit through the at least one adjustment hole;
adjusting a position of the sensor unit so as to adjust the gap between the sensor unit and the scale; and
removing the gap gauge and re-installing the cover.

* * * * *